(12) United States Patent
Sharifi Mehr et al.

(10) Patent No.: US 11,150,927 B1
(45) Date of Patent: Oct. 19, 2021

(54) POLICY-BASED VIRTUAL MACHINE INSTANCE COTENANCY

(71) Applicant: AMAZON TECHNOLOGIES, INC., Seattle, WA (US)

(72) Inventors: Nima Sharifi Mehr, Vancouver (CA); Narasimha Rao Lakkakula, Bothell, WA (US); Scott Gerard Carmack, Mercer Island, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 157 days.

(21) Appl. No.: 14/822,388

(22) Filed: Aug. 10, 2015

(51) Int. Cl.
*G06F 9/455* (2018.01)

(52) U.S. Cl.
CPC .. *G06F 9/45558* (2013.01); *G06F 2009/4557* (2013.01); *G06F 2009/45562* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 8,769,642 B1 | 7/2014 | O'Neill et al. | |
| 2007/0250833 A1* | 10/2007 | Araujo, Jr. | G06F 21/6218 718/1 |
| 2009/0210527 A1* | 8/2009 | Kawato | G06F 9/45558 709/224 |
| 2012/0084443 A1 | 4/2012 | Theimer et al. | |
| 2013/0086662 A1 | 4/2013 | Roth et al. | |
| 2014/0123135 A1* | 5/2014 | Huang | H04L 41/5054 718/1 |
| 2015/0319160 A1* | 11/2015 | Ferguson | H04L 63/0428 726/10 |

\* cited by examiner

*Primary Examiner* — Lewis A Bullock, Jr.
*Assistant Examiner* — Melissa A Headly
(74) *Attorney, Agent, or Firm* — Knobbe Martens Olson & Bear LLP

(57) ABSTRACT

This document describes techniques for placing instances on servers of a service provider environment. In an example embodiment, a system can determine that characteristics of a new virtual machine instance match a co-tenant policy of an existing virtual machine instance on a server and factor that information into a decision to place the virtual machine instance.

14 Claims, 11 Drawing Sheets

POLICY-BASED VIRTUAL MACHINE INSTANCE COTENANCY

BACKGROUND

As an increasing number of applications and services are being made available over networks such as the Internet, an increasing number of service providers are turning to technologies such as cloud computing. In general, cloud computing is an approach to providing access to remote resources through a network. Such resources may include hardware and/or software. Hardware resources may include computers (e.g., servers), mass storage devices, and other useful hardware elements. Software resources may include operating systems, databases, etc. Customers of the service provider can create and manage virtual machine instances using the service provider's resources and can load desired software applications on such virtual machine instances. The customer then may pay for use of the service provider's resources rather than owning and operating his or her own hardware and software resources.

A virtual machine instance is a logical collection of resources within a physical machine (e.g., a server). Multiple virtual machine instances may be co-located on the same server. As such, a customer that owns a given virtual machine may have his virtual machine instance located on the same physical server as a virtual machine instance owned by a different customer. Any number of disparate customers may have their virtual machines co-located on the same physical server. In some cases, a customer has no control over the decision as to which other customers' virtual machine instances are hosted on the same server.

BRIEF DESCRIPTION OF THE DRAWINGS

For a detailed description of various examples, reference will now be made to the accompanying drawings in which.

DETAILED DESCRIPTION

Figure 1:
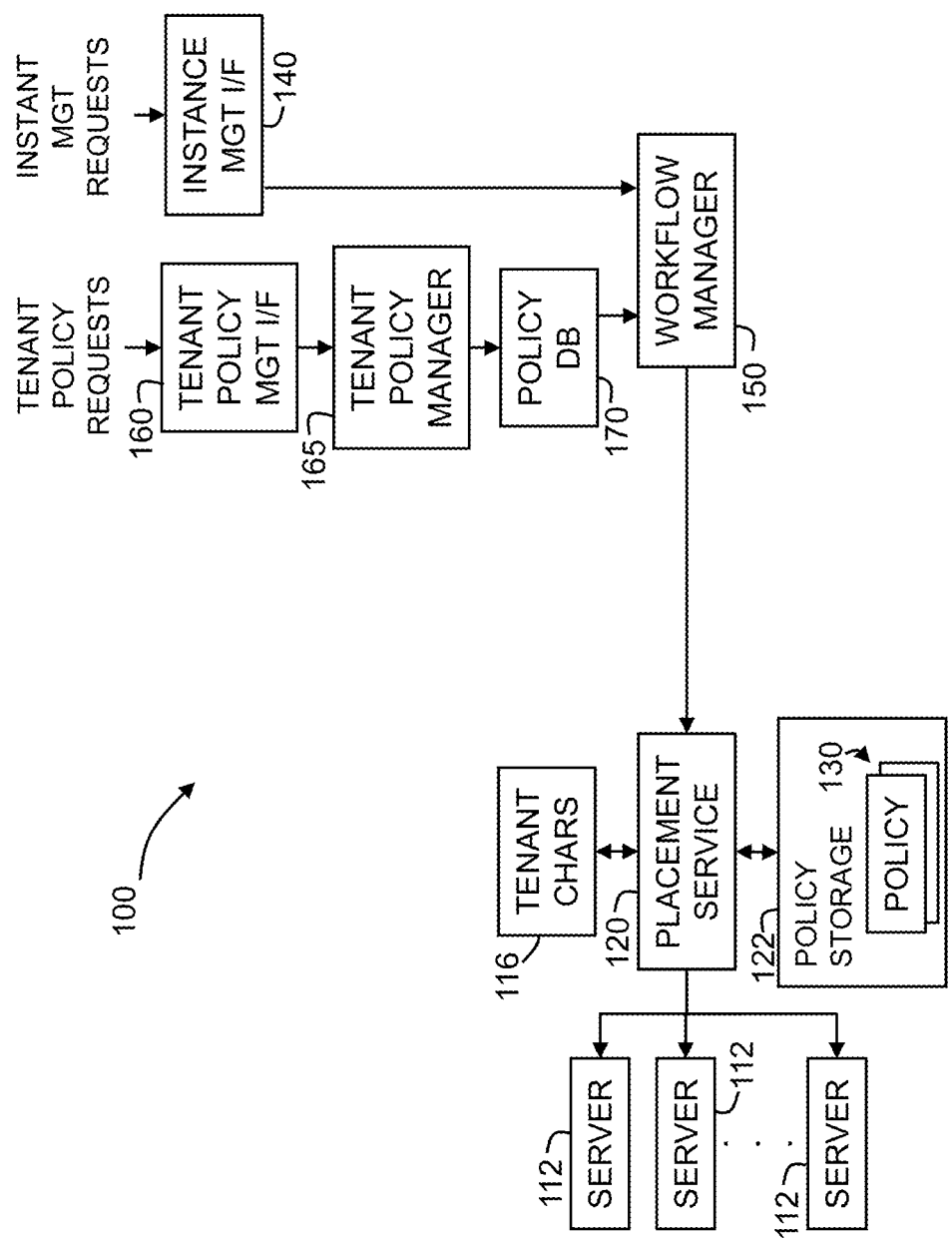
FIG. 1 shows a service provider network in which placement services determine on which physical servers to cause individual virtual machine instances to be launched taking into account co-tenant policies specified by customers in accordance with various examples.

The following description is directed to providing customers with control over the placement of other virtual machine instances on the same physical server as the customers' own virtual machine instances. Some customers may not care whether their virtual machine instances are hosted on the same physical server as other virtual machine instances. Other customers may not want any other customer's virtual machines on their servers, and instead prefer to have a dedicated server host the instances. However, some customers may be tolerant of other virtual machine instances located on their server, but they would like to have some degree of control over which virtual machine instances the service provider places on their server.

Through web and other types of user interfaces, customers of a service provider of hardware and software resources are able to create and manage virtual machine instances for use by the customer and other entities to which the customer wants to give access (e.g., clients of the customer). Through such interfaces, each customer also is able to specify a cotenant policy. A cotenant policy includes one or more requirements with which the service provider must abide when deciding where (i.e., on which server) to place new virtual machine instances. For example, a customer can create a cotenant policy that dictates that only virtual machine instances that meet certain minimum requirements can be placed on the same physical server as the customer's own virtual machine instance. Cotenant policies can specify a wide variety of cotenant requirements such as virtual machine type, operating system type, security, etc. For example, a cotenant policy can specify that only virtual machine instances that run a particular version of an operating system and that employ multifactor authentication for accessing the instance can be placed on the same physical server as the customer that created the cotenant policy.

In some embodiments, a separate cotenant policy may have been created for each virtual machine instance that is placed on a physical server by the respective owners of such instances. Such virtual machine instances are only placed on the same physical server if doing so complies with all applicable cotenant policies. Multiple virtual machine instances may be placed on the same physical server if such placement is deemed initially to result in compliance with all of their cotenant policies. Subsequently, the system continues to reassess whether each cotenant policy remains in compliance and if a cotenant policy is no longer in compliance, the system will select one a cotenant for migration to another physical server in response to the cotenant policy violation condition.

In some embodiments, a customer can create a cotenant policy to include any one or more of a variety of cotenant restrictions such as those listed above and provided in more detail below. Additionally or alternatively, a customer can specify a "trust score" in its cotenant policy. The system may compute a trust score for each virtual machine instance before it is launched on a physical server. The trust score generally indicates the level of trustworthiness of the virtual machine instance. For example, a particular virtual machine instance that runs the latest version of an operating system, that requires multifactor authentication for access to the instance, that has a firewall, and that has a high traffic load may be deemed more trustworthy than a virtual machine instance that runs an old version of an operating system, requires no user authentication, has no firewall and has very little traffic load. The trust score for the former virtual machine instance will be higher than for the latter. A customer can be specify in its cotenant policy that only virtual machine instances with a certain minimum trust score can be placed in the same physical server as the customer's own instances.

This disclosure thus relates to a customer being able to control the service provider's ability to locate other virtual machine instances on the same server as the customer's own virtual machine instance. The terms "tenant" and "cotenant" are used below. A tenant is generally synonymous with a virtual machine instance that is hosted on a server. Cotenants refer to two or more tenants that are hosted on the same server. Cotenants may include virtual machine instances of the same customer (e.g., instances managed under the same customer account) and/or may include virtual machine instances of different customers. References to a "new" tenant refers to a virtual machine instance that has not been created on a server but will be. In some cases, a "new" tenant may simply distinguish a more recently created instance from a previously created instance.

FIG. 1 shows an example of a service provider network 100 of a service provider that includes multiple servers 112 on which virtual machine instances can be created for customers of the service provider. A placement service 120 also is included which itself may be a server, or a collection of servers cooperating together to receive requests to create virtual machine instances. Based on a variety of factors, such as the cotenant policies discussed herein, each placement service 120 decides which physical server 112 to launch a new virtual machine instance. Launching a virtual machine instance may include, for example, allocating various hardware resources (e.g., processors, memory, etc.), loading a virtual machine manager, an operating system, and various user-space applications. A virtual machine image may be selected by a customer to be used to dictate the desired elements of the virtual machine. The placement service 120 selects a particular server 112 and then causes the virtual machine instance to be launched on the selected server.

An instance management interface 140 permits customers to submit instance management requests to have virtual machine instances created, edited, deactivated, and otherwise managed. The instance management interface 140 may comprise a collection of hardware resources such as processors and memory to generate and provide web pages to a customer for display on a browser running on the customer's computing device (e.g., desktop computer, notebook computer, tablet device, smart phone, etc.). Through the web pages provided by the instance management interface 140, the customer is able to interact with the service provider's network to create and manage its virtual machine instances. Other types of instance management interfaces 140 are possible as well such as a command line interface or a script execution engine.

A workflow manager 150 is operatively coupled to the instance management interface 140 and receives requests from the customers to create and manage virtual machine instances, as well as other types of customer requests. The workflow manager 150 processes such requests. In one example, the workflow manager 150 may determine whether the customer has requested a virtual machine instance to be created and hosted. If so, the workflow manager 150 forwards the customer's request for a new virtual machine instance or otherwise generates a series of workflow commands and messages to be sent to the placement service 120 to initiate the process of causing the virtual machine instance to be created as requested by the customer.

Customers of service provider's network 100 are able to have virtual machine instances created by the network 100 and hosted on a physical server, and control whether other customers' virtual machine instances can be hosted on the same server. Customers can create cotenant policies by interacting with the tenant policy management interface 160. Like the instance management interface, the tenant policy management interface 160 may generate and provide web pages to a customer for display on a browser running on the customer's computing device. Through the web pages provided by the tenant policy management interface 160, the customer is able to create a cotenant policy. Other types of tenant policy management interfaces are possible as well such as a command line interface or a script execution engine. The tenant policy management interface 160 and the instance management interface 140 may be integrated as one use interface or as separate user interfaces. Each interface 140, 160, as well as the workflow manager 150, is implemented as computer hardware (e.g., processors, memory, etc.) executing software.

The components shown in FIG. 1 may be provided within a data center. A service provider may be provide multiple data centers or availability zones, with each data center/availability zone including some or all of the components shown in FIG. 1.

A cotenant policy may reflect any one or more of a variety of requirements for other virtual machine instances to be hosted on the same server. By way of an example, a cotenant policy may specify a certain account identifier or multiple account identifiers and only those virtual machines created under those account identifiers may be placed on the same server. A customer logs on to the service provider's network under a particular account and an account identifier is associated with that account. When the customer requests a virtual machine instance to be created, the account identifier may be assigned to the virtual machine instance request. A particular customer may create a cotenant policy that permits only those virtual machines created under the same account identifier to be located on the same physical server as that customer.

By way of an additional example, a cotenant policy may permit cotenancy of only a certain type of virtual machine image (VMI), a particular version of a virtual machine image, and/or a particular patch level for a virtual machine image. Table I below provides an illustrative list of potential restrictions that can be used to define cotenant policies. Additional or different restrictions can be used as well.

TABLE I

Cotenant Policy Restrictions

| Restriction | Description |
| --- | --- |
| Account Identifier | Identifier of a service provider account |
| VMI Type | Type of virtual machine image used to create a virtual machine |
| VMI Version | To the extent that a given type of virtual machine image has multiple versions, a customer can specify the version |
| VMI Patch Level | The patch identifier for an existing virtual machine image-the patch includes updates to the virtual machine image |
| Digitally signed VMI | Customer can specify that a virtual machine instance must be digitally signed and/or that the virtual machine instance is digitally signed by a certain customer-specified signature authority |
| Operating System (O/S) Type | Type of O/S (e.g., Linux) |
| O/S Version | Version of the O/S |
| O/S Patch Level | Patch level of the O/S |
| Security Level | Any type of security restriction. Examples include single factor or multifactor authentication and/or the use of a firewall or antivirus software |
| Cotenant Size | Customer specifies a minimum or maximum size of a cotenant in terms of business revenue, data traffic rate, etc. |
| Geographic Location | Customer may not want a cotenant whose business entity originates in certain customer-specified areas of the world |

Figure 2:
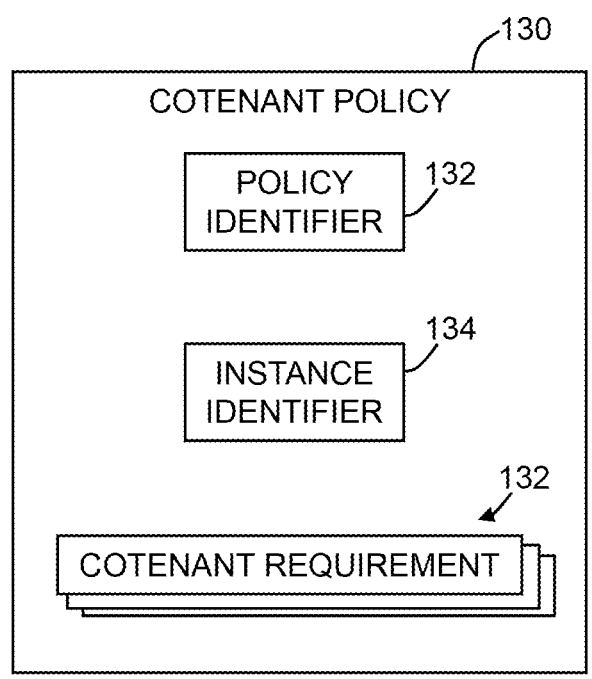
FIG. 2 shows an example of a co-tenant policy.

FIG. 2 shows an example of the components of a cotenant policy 130. As shown in this example, the cotenant policy 130 includes a policy identifier 132, an instance identifier 134, and one or more cotenant requirements 136. The policy identifier 132 uniquely identifies the cotenant policy. For example, the policy identifier 132 may correspond to an alphanumeric string or integer number. The policy identifier 132 may be used to reference the corresponding cotenant policy 130.

A customer creates a virtual machine instance and also may create a cotenant policy associated with the virtual machine instance. The instance identifier 134 in the cotenant policy uniquely identifies the virtual machine instance for which the cotenant policy is created and mapped. The same identifier may be included in the corresponding virtual machine instance and/or the request for the creation of the virtual machine instance.

Each cotenant requirement 136 specifies one or more of the above-identified requirements from Table I, or other requirements. In some embodiments, the cotenant policy 130 may be created based on a syntactical language that affords a customer a variety of options for creating the cotenant policy. The customer may type in the individual elements of the cotenant policy through a web interface implemented by the tenant policy management interface 160. Alternatively, the customer may generate the cotenant policy in a separate file (e.g., a text file) and upload the file through the tenant management interface 160 to the tenant policy manger 165. Individual cotenant requirements (e.g., certain account identifiers, the use of multifactor authentication, the use of a particular operating system, etc.) can be specified and strung together, if desired, by Boolean operators. By way of example, a requirement that the only cotenants permitted under the cotenant policy are those cotenants having account identifier "A12398" may be specified as "account identifier='A12398.'"

Referring again to FIG. 1, the tenant policy manager 165 receives tenant policy instructions from the customer via the tenant policy management interface 160. The tenant policy manager 165 assembles the various customer-provided inputs into a cotenant policy and stores the policy in a policy database 170. Thus, policy database 170 stores multiple cotenant policies for one or more customers. Each cotenant policy includes requirements limiting the ability of the placement services 120 to place virtual machine instances in certain servers based on the cotenant policy of a new virtual machine instance to be placed in a server and/or a cotenant policy of an existing cotenant already hosted on a server. Each cotenant policy stored in policy database 170 corresponds to a particular virtual machine instance—either an instance already hosted on a server or an instance yet to be hosted on a server. A customer may have a separate cotenant policy for each of their instances or may use the same cotenant policy for all of the customer's instances.

As explained above, the workflow manager 150 transmits requests to the various placement services 120 to request that the placement services 120 decide on which physical server to have a new virtual machine instance hosted. Along with transmitting the virtual machine creation requests, the workflow manager 150 accesses the policy database 170 to determine if the new virtual machine instance (i.e., the instance to be created) has a corresponding cotenant policy. In another embodiment, the workflow manager 150 may send a message to the tenant policy manager 165 to ask whether a corresponding cotenant policy exists for the virtual machine instance to be created. The tenant policy manager 165 can access the policy database 170 and provide the corresponding cotenant policy, if any, to the workflow manager 150. The workflow manager transmits both the request to create a new virtual machine instance to a placement service 120, as well as a corresponding cotenant policy, if there is one for the new virtual machine instance.

Each placement service 120 receives requests to create virtual machine instances directly or indirectly from the workflow manager 150. Based on a variety of factors, each placement service 120 decides on which server 112 should host each newly requested virtual machine instance. Each request for creation of a virtual machine instance may specify, among other things, a type of virtual machine instance. The various types of virtual machine instances may vary in terms of computing power, memory capacity, etc. In some embodiments, each server 112 is configured to host the same types of virtual machine instances. That is, some servers 112 host virtual machines of one particular type and other servers 112 host virtual machine instances of a different type. A factor that the placement service 120 may consider when selecting a server 112 to host a new virtual machine instance is the type of virtual machine instance. The placement service 120 may also balance the placement of new virtual machine instances across the various servers 112 for performance reasons.

In addition to such factors, the placement service 120 takes into account cotenant policies when deciding where to place new virtual machine instances. The cotenant polices may include the cotenant policy of the new virtual machine instance to be placed and/or the cotenant policies of the existing virtual machine instances already hosted on the various servers.

Figure 3:
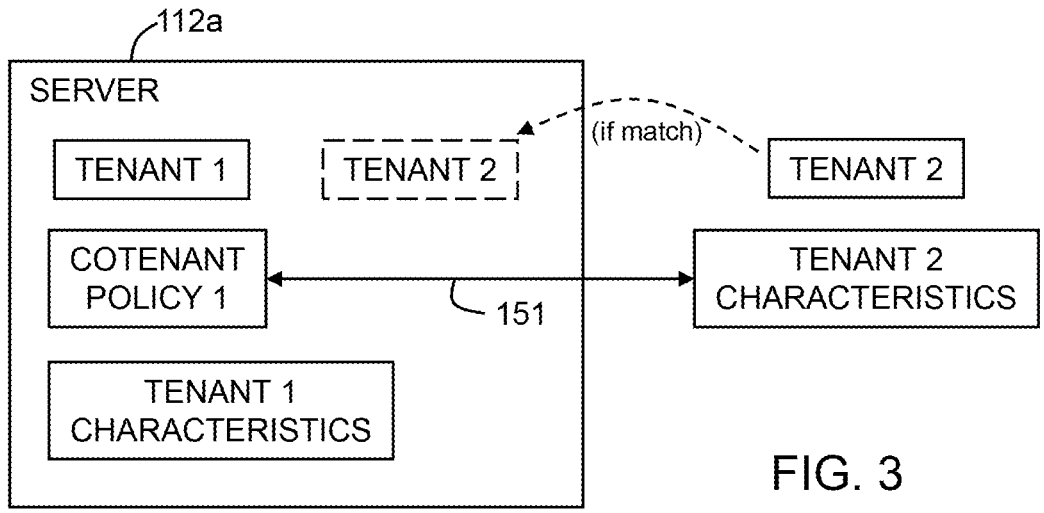
FIG. 3 shows an example of determining whether to place a new tenant on a server with an existing tenant based on the co-tenant policy specified by the existing tenant in accordance with various examples.

FIG. 3 shows an example of a server 112a which currently hosts a virtual machine instance (designated as Tenant 1). Tenant 1 has characteristics designated as Tenant 1 Characteristics. Such characteristics include any one or more of the elements listed in Table I (e.g., account identifier, type of virtual machine image, type of operating system, security level, etc.).

The customer that had the service provider create Tenant 1 also specified a cotenant policy corresponding to Tenant 1. The cotenant policy is designated as Cotenant Policy 1. Cotenant Policy 1 provides restrictions on which other tenants can be placed on the same server 112a as Tenant 1. Cotenant Policy 1 and Tenant 1 Characteristics may be stored on server 112a with Tenant 1, or on storage elsewhere as indicated by FIG. 1 (policy storage 122). In either case, Tenant 1 Characteristics and Cotenant Policy 1 are accessible to the placement service 120. A new virtual machine instance (Tenant 2) is requested to be created and hosted on a server 112. Tenant 2 has characteristics (such as those listed above) designated as Tenant 2 Characteristics. The customer requesting Tenant 2 to be created has not specified a cotenant policy for Tenant 2.

A placement service 120 receives the request for the creation of Tenant 2 and its characteristics and selects a particular server 112 on which to have Tenant 2 hosted. The placement service 120 may determine that server 112a is a candidate for hosting Tenant 2 (e.g., server 112a is configured to host the same type of virtual machine instance as Tenant 2). The placement service 120 also considers Co-Tenant Policy 1 associated Tenant 1. For example, the placement service 120 compares Tenant 2 Characteristics to Co-Tenant Policy 1 (as indicated by arrow 151) to determine if placing Tenant 2 on server 112a would comply with or violate Co-Tenant Policy 1. For example, if Co-Tenant Policy 1 requires co-tenants to run a particular version of an operating system and to require multifactor authentication for access to such cotenants, then the placement service 120 determines whether Tenant 2 Characteristics include such requirements. If Tenant 2 Characteristics have the requirements specified by Co-Tenant Policy 1, then the placement service 120 determines that placement of Tenant 2 on server 112a will not result in a violation of Co-Tenant Policy 1. However, if Tenant 2 Characteristics do not have all of the requirements specified by Co-Tenant Policy 1, then the placement service 120 determines that placement of Tenant 2 on server 112a will result in a violation of Co-Tenant Policy 1. If the placement service 120 determines that Co-Tenant Policy 1 will be not be violated, then the placement service 120 causes Tenant 2 to be created and hosted on server 112a. Otherwise, the placement service 120 will not permit Tenant 2 to be hosted on server 112a out of respect for Tenant 1's co-tenant policy, and instead consider another server 112 for hosting Tenant 2.

Figure 4:
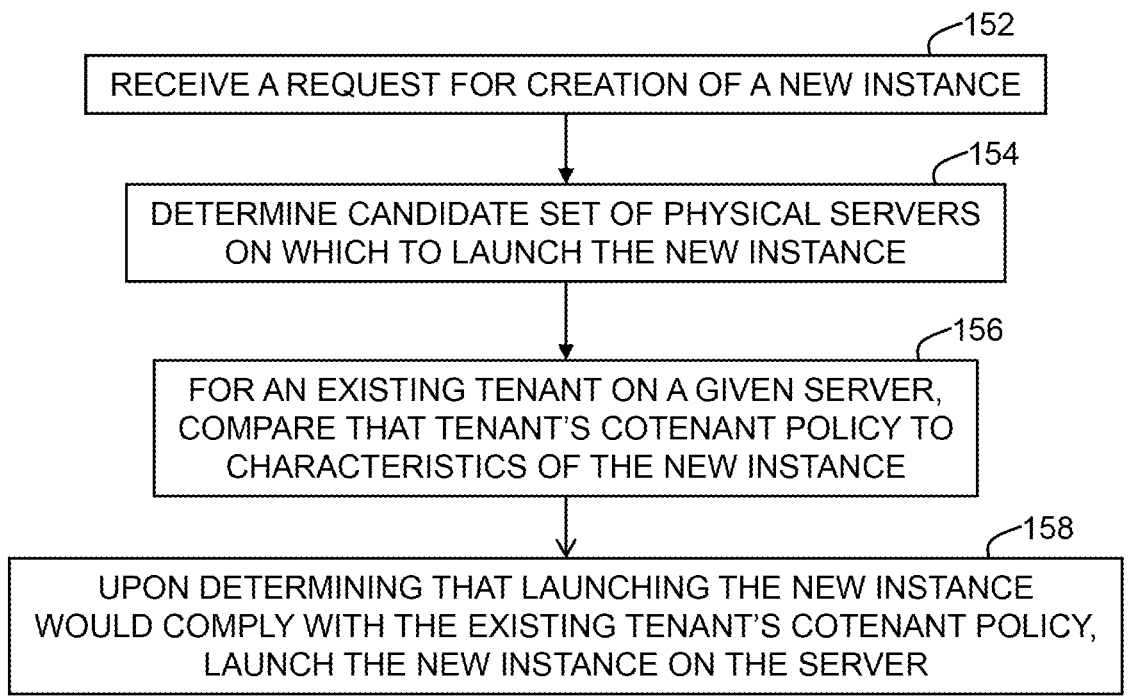
FIG. 4 shows a method corresponding to the example of FIG. 3 for determining whether to place the new tenant on the same server as an existing tenant in accordance with various examples.

FIG. 4 shows a method that corresponds to the example of FIG. 3. The operations shown in FIG. 4 can be performed in the order shown, or in a different order, and two or more of the operations may be performed concurrently rather than sequentially. At 152, the method includes receiving a request for creation of a new instance. The request may be originated by a customer through interaction with instance management interface 140. The workflow manager 150 determines the appropriate placement service 120 to process the instance creation request. For example, a customer may specify that the new virtual machine instance is to be hosted in a particular availability zone or data center and thus the workflow manager 150 determines the placement service 120 in that particular availability zone/data center should execute the instance creation request. The instance creation request, or one or more messages that the workflow manager 150 generates to implement the instance creation request, is transmitted to the appropriate placement service 120 by the workflow manager. The request to create the new instance thus is received by the placement service 120.

At 154, the method includes determining a candidate set of physical servers on which to launch the new instance. The candidate set of physical servers 112 include those servers any one of which would be satisfactory for hosting the new virtual machine instance. This operation may be performed by the placement service 120 that receives the request to create the new virtual machine instance. The determination of the candidate set of physical servers includes determining which servers 112 are configured to host the new virtual machine instance. As explained above, individual servers 112 may be configured for different types of virtual machine instances, different types of operating systems, and different types of networking support. Thus, in some embodiments, not all servers 112 are appropriate for hosting a given virtual machine instance. The placement service 120 also may take into account other factors when determining the candidate set of physical servers to host a particular virtual machine instance. For example, if a particular server 112 has been reported to have experienced more than a threshold number or rate of problems (e.g., memory errors, CPU errors, network connection timeouts, etc.), the placement service 120 may not include that particular server 112 in its candidate set of servers even though that server otherwise may be capable of hosting the new virtual machine instance. The placement service may take into account capacity in each server 112 for hosting a new virtual machine instance. For example, if one server 112 already is hosting four virtual machine instances and another server 112 none, the server currently devoid of any virtual machine instances may be prioritized by the placement service 120 over the former server as part of its selection criteria for determining a candidate set of physical servers. Density of virtual machine instances also may be considered as part of the placement criteria.

Once the candidate set of physical servers 112 is determined by the placement service 120 the method includes, for an existing tenant on a given server among the candidate set of servers, comparing (156) that tenant's cotenant policy to the characteristics of the new virtual machine instance. FIG. 3 shows an example of this operation in which Co-Tenant Policy 1 is compared to Tenant 2 Characteristics. This operation may be performed by the placement service 120 accessing policy storage 122 to retrieve the cotenant policy 130 of the existing tenant and comparing the cotenant requirements in the cotenant policy of the existing virtual machine instance (Tenant 1) to the corresponding characteristics of the new virtual machine instance (Tenant 2). For example, if a cotenant requirement in the cotenant policy is that a new virtual machine instance must run version of an operating system and must have a certain customer account identifier, then the placement service 120 determines whether the new virtual machine instance to be created (Tenant 2) has the required operating system version and the account identifier.

Upon determining that launching the new virtual machine instance would result in compliance with the existing cotenant policy 130, then at 158 the placement service 120 causes the new virtual machine instance to be launched (i.e., created) on the server 112a as a cotenant with the existing tenant. In some embodiments, the placement service 120 submits an instruction to an instance manager to launch the new virtual machine instance. In other embodiments, the placement service 120 itself may launch the new virtual machine instance.

Figure 5:
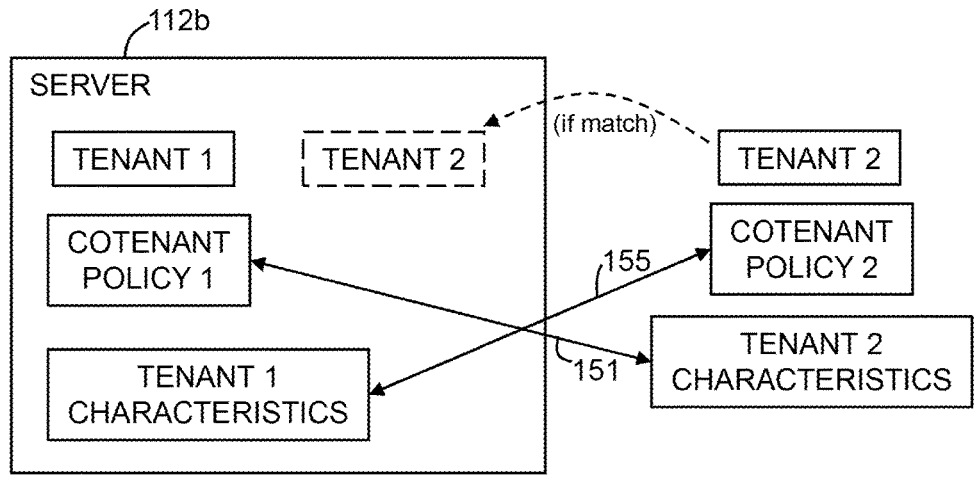
FIG. 5 shows another example of determining whether to place a new tenant on a server with an existing tenant based on the co-tenant policies specified by the existing tenant and the new tenant in accordance with various examples.

FIG. 5 shows an example in which a server 112b includes Tenant 1, along with Co-Tenant Policy 1 and Tenant 1 Characteristics as noted above. A request has been made to launch a new virtual machine instance, Tenant 2. Tenant 2 has its own co-tenant policy and characteristics designated as Co-Tenant Policy 2 and Tenant 2 Characteristics, respectively. Whereas in FIG. 3, the only concern was compliance with the existing tenant's co-tenant policy, in FIG. 5, the placement service 120 compares the existing tenant's co-tenant policy to the characteristics of the new tenant, and also compares the new tenant's co-tenant policy to the characteristics of the existing tenant, as indicated by arrows 153 and 155. The placement service 120 will not cause the new virtual machine instance (Tenant 2) to be placed in server 112b unless both cotenant policies are determined to be in compliance. That is, the placement server determines whether placement of Tenant 2 on server 112b will comply with the existing tenant's co-tenant policy (Co-Tenant Policy 1) and also whether the new tenant's co-tenant policy (Cotenant Policy 2) will be in compliance. If both co-tenant policies will be in compliance, then Tenant 2 can be launched on server 112. Otherwise, if either or both co-tenant policies will not be in compliance, then the placement service 120 will not permit Tenant 2 to be launched on server 112b.

Figure 6:
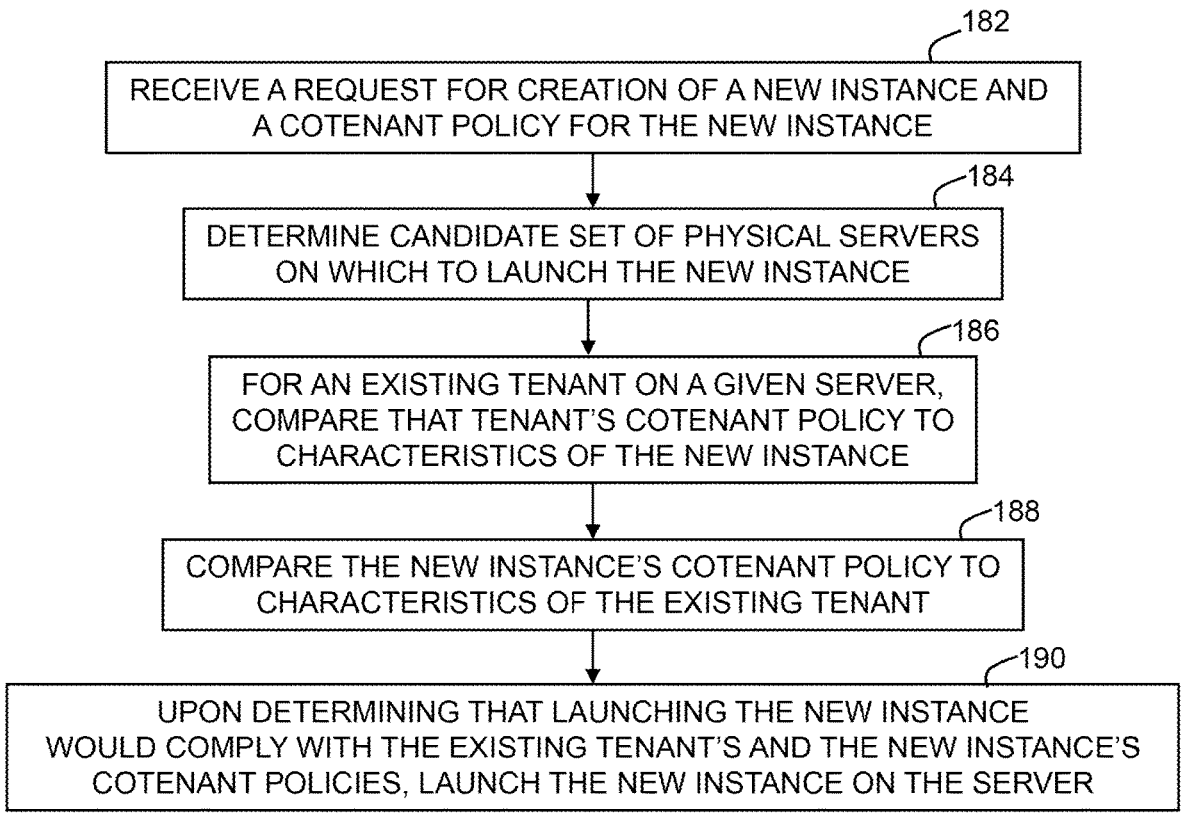
FIG. 6 shows a method corresponding to the example of FIG. 5 for determining whether to place the new tenant on the same server as an existing tenant based on both tenants' cotenant policies in accordance with various examples.

FIG. 6 shows a method that corresponds to the example of FIG. 5. The operations shown in FIG. 6 can be performed in the order shown, or in a different order, and two or more of the operations may be performed concurrently rather than sequentially. At 182, the method includes receiving a request for creation of a new virtual machine instance along with a cotenant policy associated with the new virtual machine instance. As explained above with respect to FIG. 4, the request may be originated by a customer through interaction with instance management interface 140 and the workflow manager 150 determines the appropriate placement service 120 to process the instance creation request. The cotenant policy as well as the instance creation request, or one or more messages that the workflow manager 150 generates to implement the instance creation request, are transmitted to the appropriate placement service 120.

At 184, the method includes determining a candidate set of physical servers on which to launch the new instance. This operation may be performed by the placement service 120 in the same or similar manner as that described above and generally includes determining which servers 112 are suitable to host the new virtual machine instance—without consideration at this point of the cotenant policy of the new virtual machine instance.

Once the candidate set of physical servers 112 is determined by the placement service 120 the method includes, for an existing tenant on a given server among the candidate set, comparing (186) that existing tenant's cotenant policy to the characteristics of the new virtual machine instance. FIG. 5 shows an example of this operation in which Co-Tenant Policy 1 is compared to Tenant 2 Characteristics. This operation may be performed by the placement service 120 accessing policy storage 122 to retrieve the cotenant policy 130 of the existing tenant and comparing the cotenant requirements in that tenant's cotenant policy to the corresponding characteristics of the new tenant.

At 188, the method also includes comparing the new virtual machine instance's cotenant policy to characteristics of the existing tenant. In the example of FIG. 5, Cotenant Policy 2 is compared by the placement service 120 to Tenant 1 Characteristics. This comparison is much the same as that described above—for example, determining whether the tenant requirements encoded into the new virtual machine instance's cotenant policy are satisfied by the characteristics of the existing tenant on server 112b.

Upon determining that launching the new virtual machine instance (Tenant 2) would result in compliance with the existing tenant's cotenant policy and with the new virtual machine instance's cotenant policy, then at 190 the placement service 120 causes Tenant 2 to be launched on the server 112b as a cotenant with the existing tenant (e.g., launches the new virtual machine itself or requests another service to do so).

Figure 7:
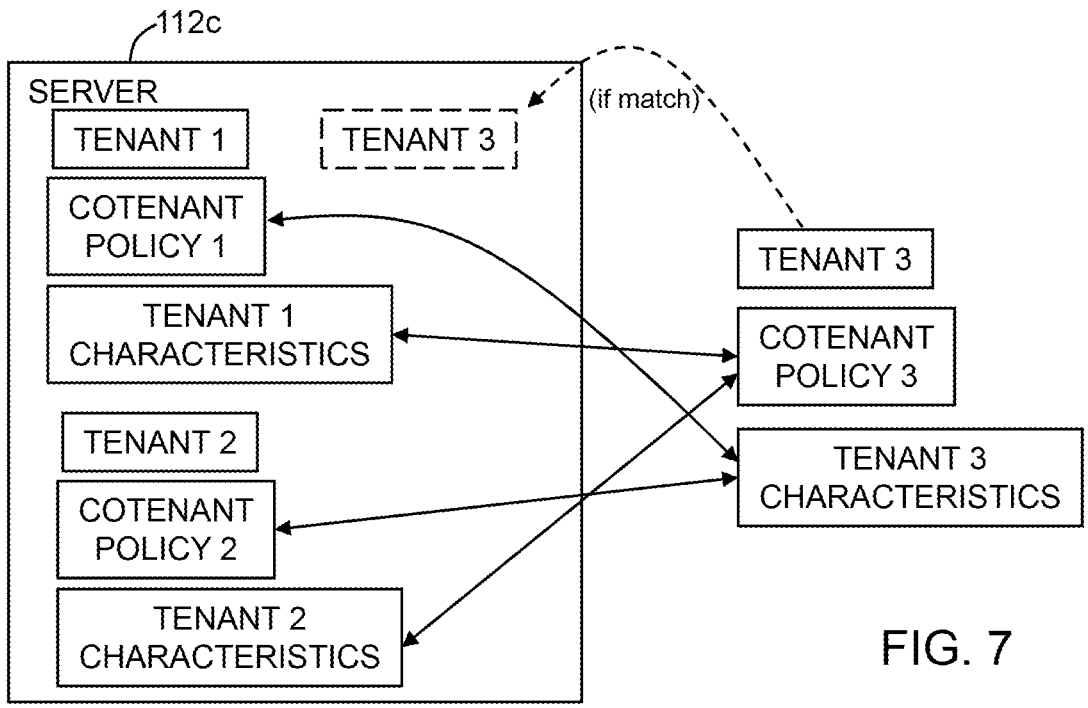
FIG. 7 shows another example of determining whether to place a new tenant on a server with multiple existing tenants based on the co-tenant policies specified by the existing tenants and the new tenant in accordance with various examples.

The example of FIG. 7 is similar to that of FIG. 5. A new virtual machine instance (Tenant 3) is to be created and the new virtual machine instance has its own characteristics (Tenant 3 Characteristics) and cotenant policy (Cotenant Policy 3). Server 112c currently hosts two existing virtual machine instances designated as Tenant 1 and Tenant 2. Each existing tenant has its own cotenant policy (Cotenant Policy 1 and Cotenant Policy 2) and each existing tenant has its own set of characteristics (Tenant 1 Characteristics and Tenant 1 Characteristics). In the example of FIG. 7 all three cotenant polices are evaluated by the placement service 120 to determine whether the new virtual machine instance (Tenant 3) can be launched on server 112c. Cotenant Policy 3 of the new virtual machine instance is compared to the characteristics of each of the two existing tenants—Tenant 1 and Tenant 2, and each existing tenant's cotenant policy is compared to the characteristics of the new virtual machine instance (Tenant 3 Characteristics). The cotenant policy of each existing tenant need not be evaluated against the other existing tenant's characteristics because that comparison will already have been performed during the process of deciding whether to launch the latter of the two existing tenants on the server 112c in the first place.

Figure 8:
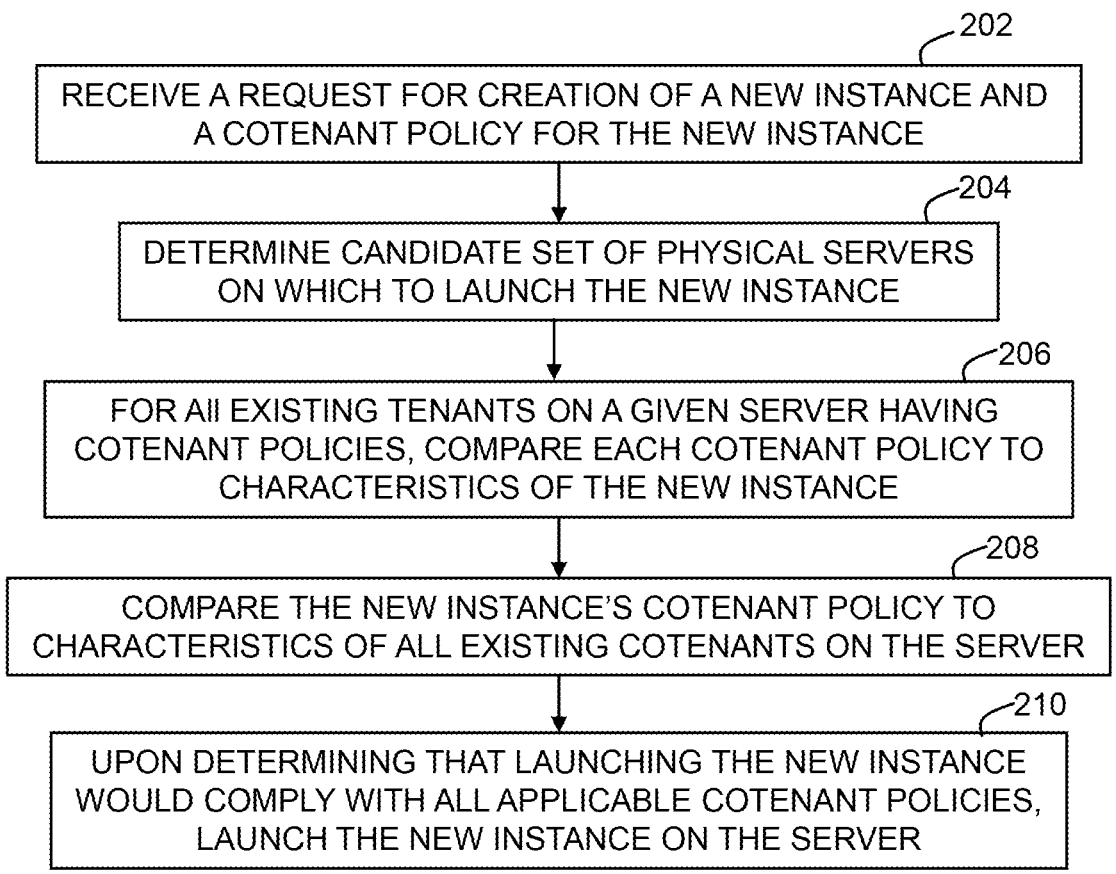
FIG. 8 shows a method corresponding to the example of FIG. 7 for determining whether to place the new tenant on the same server as multiple existing tenants in accordance with various examples.

FIG. 8 shows a method that corresponds to the example of FIG. 7. The operations shown in FIG. 8 can be performed in the order shown, or in a different order, and two or more of the operations may be performed concurrently rather than sequentially. At 202, the method includes receiving a request for creation of a new virtual machine instance (e.g., Tenant 3) along with a cotenant policy associated with the new virtual machine instance. As explained above, the request may be originated by a customer through interaction with instance management interface 140 and the workflow manager 1450 determines the appropriate placement service 120 to process the instance creation request. The cotenant policy and instance creation request, or one or more messages that the workflow manager 150 generates to implement the instance creation request, is transmitted to the appropriate placement service 120. The request to create the new instance thus is received by the placement service 120.

At 204, the method includes determining a candidate set of physical servers on which to launch the new instance. This operation may be performed by the placement service 120 in the same or similar manner as that described above and generally includes determining which servers 112 can host the new virtual machine instance—without consideration at this point of the cotenant policy of the new virtual machine instance.

Once the candidate set of physical servers 112 is determined by the placement service 120, the method includes, for all existing tenants on a given server among the candidate set of servers, comparing (206) the existing tenants' cotenant policies to the characteristics of the new virtual machine instance. FIG. 7 shows an example of this operation in which each of Cotenant Policies 1 and 2 is compared to the Tenant 3 Characteristics. This operation may be performed by the placement service 120 accessing policy storage 122 to retrieve the cotenant policies 130 of the existing tenants and comparing the cotenant requirements in those cotenant policies to the corresponding characteristics of the new virtual machine instance.

At 208, the method also includes comparing the new virtual machine instance's cotenant policy to characteristics of the existing tenants. In the example of FIG. 7, Cotenant Policy 3 is compared by the placement service 120 both to Tenant 1 Characteristics and Tenant 2 Characteristics. This comparison is much the same as that described above—for example, determining whether the tenant requirements encoded into the new virtual machine instance's cotenant policy are satisfied by the characteristics of the existing tenants on server 112c.

Upon determining that launching the new virtual machine instance would result in compliance with the existing tenants' cotenant policies and with the new tenants cotenant policy, then at 210 the placement service 120 causes the new virtual machine instance to be launched on the server 112c as a cotenant with the existing tenants (e.g., launches the new virtual machine itself or requests another service to do so).

Figure 9:
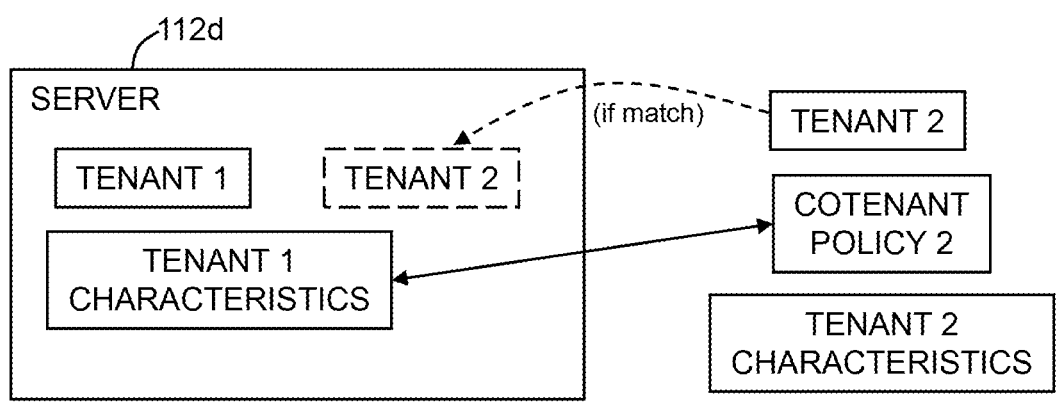
FIG. 9 shows another example of determining whether to place a new tenant on a server with an existing tenant based on the co-tenant policy of the new tenant in accordance with various implementations.

FIG. 9 shows an example of a server 112d currently hosting a virtual machine instance (Tenant 1) that does not have an associated cotenant policy. A new virtual machine instance (Tenant 2) is to be created and server 112d is a potential server on which to launch Tenant 2. The new tenant (Tenant 2) includes a cotenant policy (Cotenant Policy 2). The placement service 120 determines whether launching Tenant 2 on server 112 will permit compliance with the Tenant 2's cotenant policy. If any of the characteristics of Tenant 1 (Tenant 1 Characteristics) violate Cotenant Policy 2 in any way, the placement service 120 will not permit Tenant 2 to be launched on server 112d; otherwise server 112d is determined to be a suitable server for launching Tenant 2.

In some embodiments, even upon confirming compliance with all applicable cotenant policies and launching a virtual machine instance on a server, it is possible that modifications to the configuration and operation of a cotenant results in a violation of a cotenant policy that previously was in compliance. For example, after a particular virtual machine instance has been launched a server, the owner of the instance may change the security settings for the instance. The owner may have employed multifactor authentication initially, but subsequently decides to discontinue the use of multifactor authentication. Another tenant's cotenant policy may require all other tenants on the server to employ multifactor authentication, and thus that policy will no longer be in compliance. By way of another example, the owner of an instance may subsequently load a particular type of application on the instance that is not permitted by a cotenant policy of another tenant on the same server. Any one or more of multiple characteristics of a given tenant may be modified after launching and operating the tenant. When a characteristic of a cotenant being hosted on a server changes, the change is also reflected in the tenant characteristics 116 (FIG. 1), which are accessible by the placement service. Further still, an owner of a particular instance may change the cotenant policy for that instance after the instance has already been placed on a server. The modified policy may not be in compliance following the change due to the other tenants already on the server.

For all tenants that have cotenant policies, the placement service 120 re-evaluates the cotenant policies of all such cotenants. The cotenant policy re-evaluation may be performed periodically as a background process (e.g., once per hour, once per day, etc.), or on demand by, for example, a network administrator. If a particular cotenant policy is determined to no longer be in compliance due to a change in the characteristics of another cotenant on the same physical server or a change to the policy itself, the placement service 120 may cause the cotenant that is causing the non-compliance or the instance whose cotenant policy is being violated to be migrated from the current physical server to another server. A migration service may be invoked to perform the instance migration. Migrating a virtual machine instance from a current server to a new server may include ceasing its operation on the current server and instantiating the instance on the new server. The migration process may include copying data and state information as well. In some embodiments, if an owner of an instance attempts to change his or her cotenant policy, a check can be made at that time to determine if the change to the policy will result in the modified policy not being in compliance. If the policy will be violated, the owner can be informed that his or her instance will need to be migrated to a new server due to the change in the policy. The owner can be presented with the option (e.g., a via user interface) to cancel the change to the policy or proceed with the change (which will cause that tenant to be migrated to another server).

Figure 10:
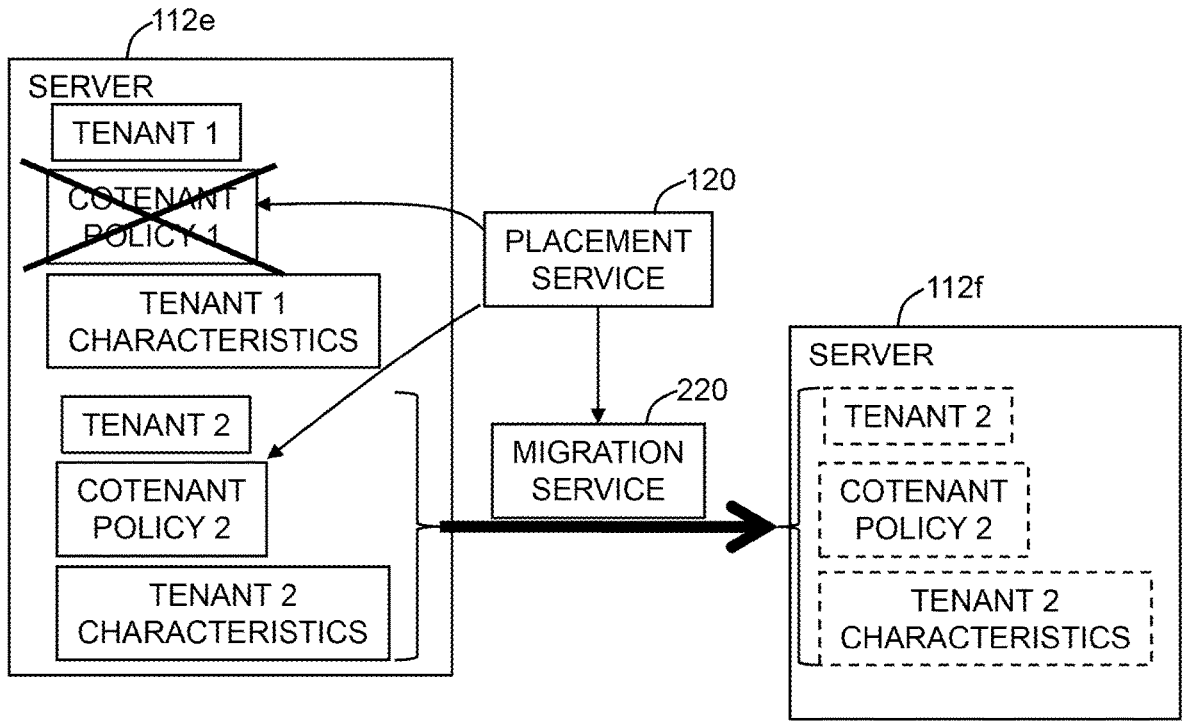
FIG. 10 illustrates a system in which an existing virtual machine instance is migrated from one server to another upon detection that a cotenant policy is no longer in compliance in accordance with various examples.

FIG. 10 shows an example of a server 112e on which two tenants are currently hosted—Tenant 1 and Tenant 2. Each tenant has its own characteristics (Tenant 1 Characteristics and Tenant 2 Characteristics) and cotenant policy (Cotenant Policy 1 and Cotenant Policy 2). Compliance with both cotenant polices was ensured by the placement service 120 before the latter of the tenants was permitted to be launched on sever 112e. Arrows 191 and 193 indicate that periodically the placement service 120 evaluates the cotenant polices of the tenants to ensure that each remains in compliance. The evaluation involves comparing each tenant's cotenant policy to the other cotenant's characteristics. Cotenant Policy 1 is compared to Tenant 2 Characteristics, and Cotenant Policy 2 is compared to Tenant 2 Characteristics. As indicated by the "X" through Cotenant Policy 1, in the example of FIG. 10, the placement service 120 determines that Cotenant Policy 1 for Tenant 1 is no longer in compliance due to a change in the characteristics of Tenant 2. The cotenant policy of Tenant 2, however, is determined to remain in compliance. In some embodiments, the placement service 120 responds by tasking a migration service 220 to migrate the offending cotenant (i.e., the one whose characteristics changed to cause a violation of another tenant's cotenant policy) to a different server 112f. As such Tenant 2 is migrated to server 112f. In other embodiments, the placement service 120 may task the migration service 220 to cause the tenant whose cotenant policy is determined to be out of compliance to be migrated to another server. Thus, the migration service 220 could migrate Tenant 1 instead of Tenant 2 to server 112f.

Figure 11:
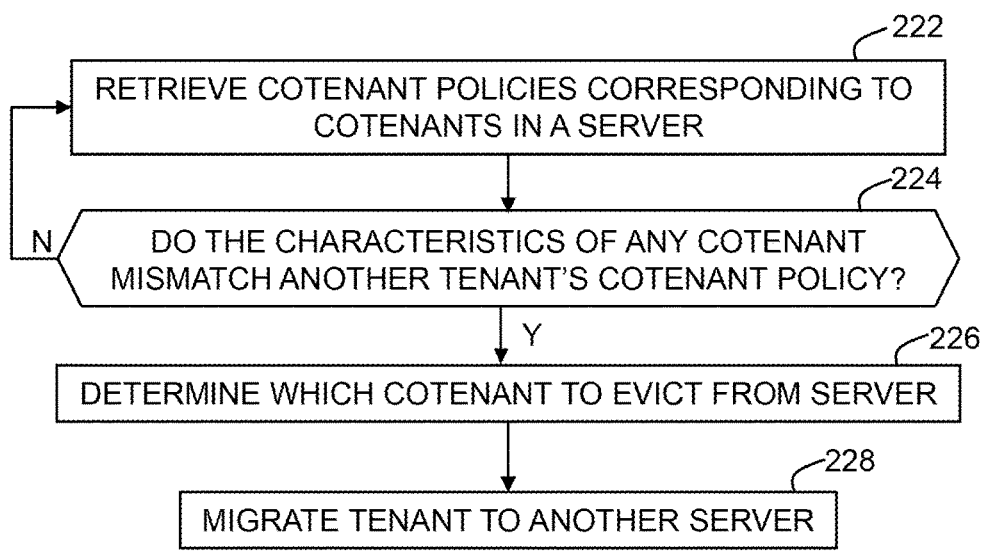
FIG. 11 illustrates a method of migrating a cotenant to another server based upon continued evaluation of the cotenant policies in accordance with various examples.

FIG. 11 shows a method that corresponds to the example of FIG. 10. The operations shown in FIG. 11 can be performed in the order shown, or in a different order, and two or more of the operations may be performed concurrently rather than sequentially. The method of FIG. 11 may be performed periodically or upon demand by any of the instance owners. At 222, the method includes retrieving the cotenant policies corresponding to each of the cotenants in a given server. The cotenant policies may be retrieved by the placement service 120 from policy storage 122.

At 224, the placement service determines whether the characteristics of any cotenant on the server mismatch a cotenant policy of any of the cotenants that have cotenant policies. If the placement service 120 determines there to be no mismatch, then control loops back to 222 for a subsequent evaluation of the cotenant policies. If, however, the placement service 120 determines there to be a mismatch between characteristics of a cotenant and another cotenant's cotenant policy, then at 226, the placement service determines which cotenant to evict from the server. As explained above, the cotenant whose change in characteristics resulted in the content policy violation may be evicted, or the cotenant whose cotenant policy is now being violated may be evicted.

At 228, the method includes migrating the cotenant to be evicted to another physical server 112. The migration service 220 may interact with the placement service 120 to determine a suitable target for the migration. In much the same way as the placement service based its original decision as to which server 112 should host the tenant that is decided now in need of being migrated, the placement service 120 compares that tenant's cotenant policy (if any) to characteristics of other tenants on other servers and compares the cotenant policies of existing tenants on the other servers to the characteristics of the tenant to be migrated (Tenant 2 in the example of FIG. 10).

Figure 12:
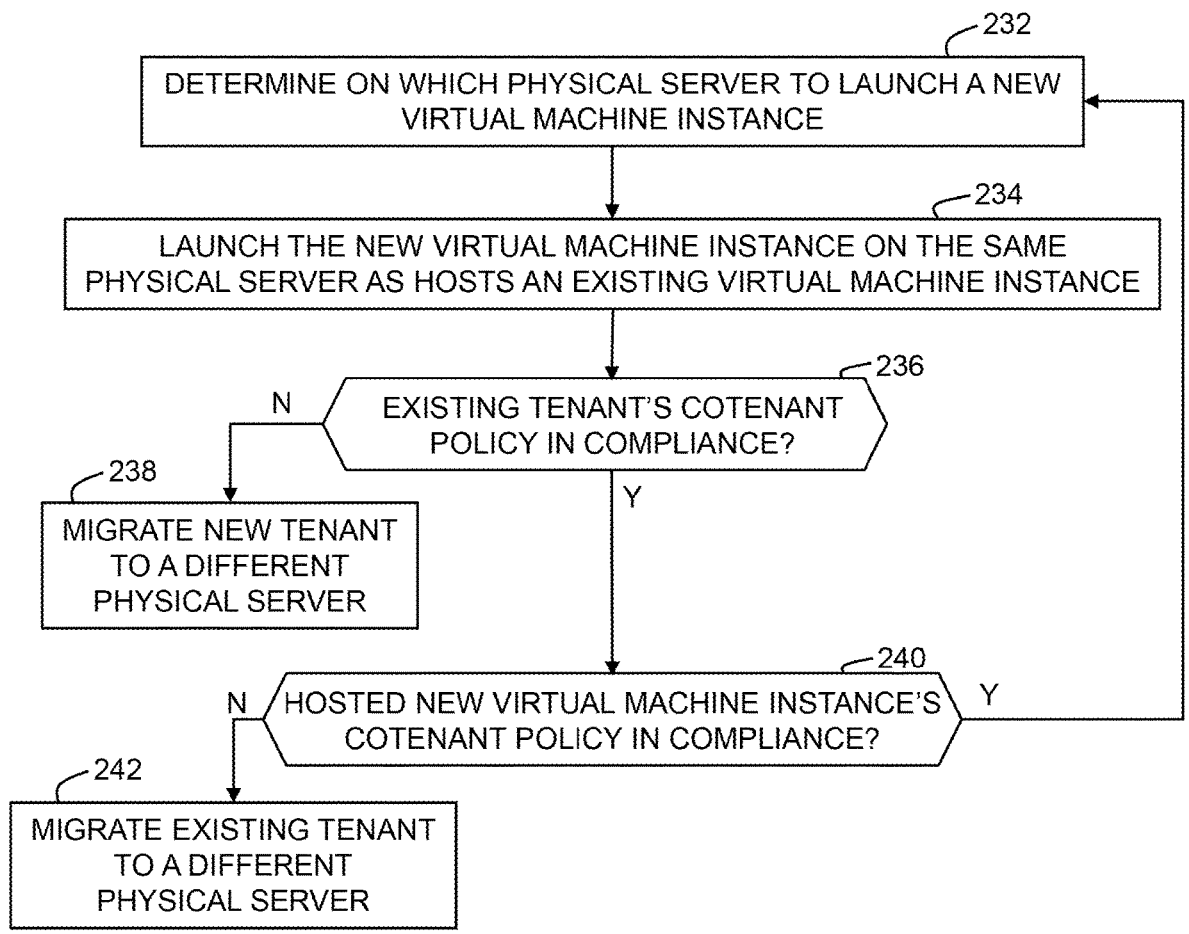
FIG. 12 illustrates a method for launching a new virtual machine instance on server based on cotenant polices and then determining whether to migrate one of the hosted virtual machine instances to a different server in accordance with various examples.

FIG. 12 shows another example of a method involving migration of an existing virtual machine instance upon a subsequent determination that a cotenant policy is currently being violated. At 232, the method includes determining on which physical server to launch a new virtual machine instance. As explained above, this determination may be based, at least in part, on a comparison of the new virtual machine instance's characteristics to an existing virtual machine instance's cotenant policy and a comparison of the existing virtual machine instance's characteristics to the new virtual machine instance's cotenant policy.

At 234, the method includes launching the new virtual machine instance on the same physical server that hosts the existing virtual machine instance. Launching the new virtual machine instance will occur on the server if all relevant cotenant policies are deemed to be in compliance. At 236, the placement service 120 determines (periodically or otherwise) whether the existing virtual machine instance's cotenant policy is compliance. This operation is performed by retrieving the characteristics of the latter created virtual machine (the "new" virtual machine instance that has now been launched on the server), and comparing those characteristics to the existing tenant's cotenant policy. If a mismatch is detected, then at 238, the new virtual machine instance is migrated away (using, for example, migration service 220) to a different physical server.

However, if the existing tenant's cotenant policy remains in compliance, then the placement service 120 determines whether the new virtual machine instance (at this point already a cotenant on the server) is still in compliance. As above, the characteristics of the existing tenant are retrieved from tenant characteristics 116 and compared to the cotenant policy of the new tenant. If the characteristics of the existing tenant have changed since the last time the cotenant policy of the new tenant has been evaluated, the placement service 120 will determine whether the changes are such that the new tenant's cotenant policy is no longer in compliance. If that is the case, then at 242, the existing tenant is migrated to a different physical server. Control otherwise loops back to 232 to repeat the process of FIG. 12.

In some embodiments, a customer can change an existing cotenant policy. For example, a customer may have created a virtual machine instance and assigned it a cotenant policy that was analyzed during the placement process as described herein. Later, the customer may decide to change the cotenant policy. For example, the customer may increase the security level requirement in the policy or change the type or version of operating systems that the customer will tolerate in its cotenants. The changes may be made through the tenant policy management interface 160 (FIG. 1) and provided to the placement service 120 in which the corresponding instance is located. The placement service 120 receives the changed cotenant policy and compares the new cotenant policy to the characteristics of the other cotenants in the same server. If the new cotenant policy is not in compliance, then the placement service 120 invokes the migration service 220 to cause a migration to occur as described above. In some embodiments, the placement service 120 evaluates the new cotenant policy immediately upon receiving it, while in other embodiments, the placement service stores the new cotenant policy in policy storage 120 for subsequent evaluation per the methods of FIGS. 11 and 12.

In addition to, or instead of, a cotenant policy specifying individual requirements such as those listed above in Table I that must be complied with to permit cotenancy, a cotenant policy may specify a trust score threshold for a cotenancy requirement. A trust score can be computed for each existing tenant and all new virtual machine instances pending their creation. The trust score for a given virtual machine instance generally reflects the trustworthiness of the instance. The trust score may be a number that represents a weighted combination of a variety of factors, at least some of which include the requirements listed in Table I. A trust score may be a number that indicates relative trustworthiness on any desired scale such as 0 to 5, 0 to 10, or 0 to 100, with 5, 10 and 100 being the highest trust scores (greatest trustworthiness) in those ranges.

Figure 13:
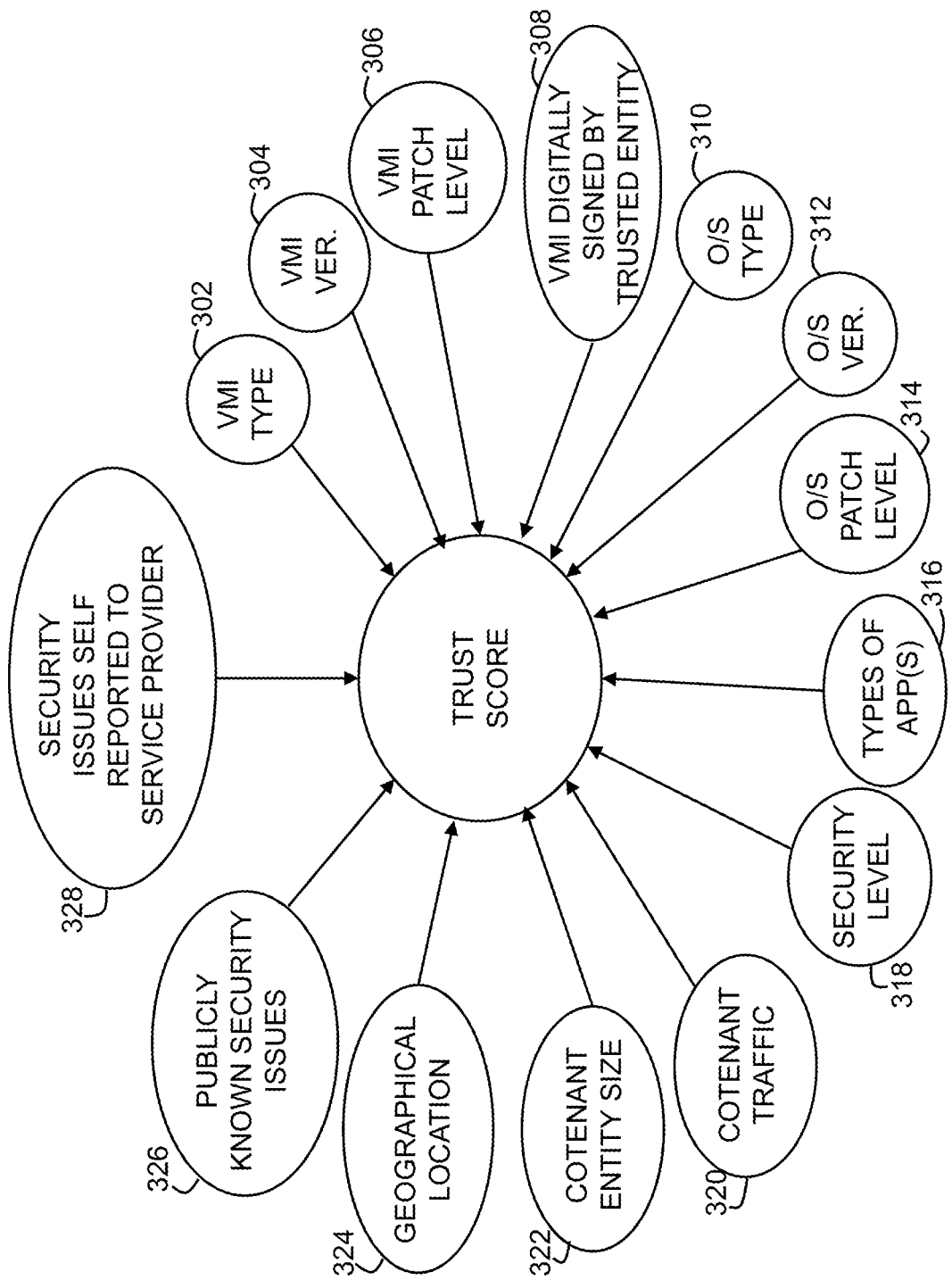
FIG. 13 illustrates examples of various factors that contribute to the computation of a trust score for a given instance in accordance with various examples.

FIG. 13 shows an example of the various factors that may contribute to the computation of a trust score. Some of the factors are specific to the virtual machine instance itself, while others relate to the entity that owns the virtual machine instance and the use of the virtual machine instance. For example, certain types of virtual machine images may be deemed more trustworthy from a security and reliability standpoint than other virtual machine images. Thus, one factor may be the virtual machine image type 302. Each virtual machine image type may be mapped apriori to a particular numerical score which then factors into the calculation of the trust score for a virtual machine instance that is created based on that virtual machine image. Similarly, each of the virtual machine image version 304, virtual machine image patch level 306, whether a VMI is digitally signed and by which trusted entity (308), O/S type 310, O/S version 312, O/S patch level 314, types of applications 316, and security level 318 also may be reduced to a numerical input score for the calculation of the trust score. Individual applications may each be assigned a value in accordance with the level of trust determined apriori for each such application. An application that historically has had a large number of bugs and has caused problems for other software systems may be assigned a lower value than applications that have not had such problems or to the same degree. If a virtual machine instance is to run multiple applications, the assigned values for the various applications may be averaged together in a weighted or unweighted fashion as desired. The security level 318 may include a variety of factors such the type of authentication (e.g., single versus multifactor authentication), whether a firewall is used, whether and the type of antivirus software is used, etc. As for the application type factor 316, each security type may be assigned a value and such values may be averaged together (weighed or unweighted). Factors 302-318 are generally specific to the virtual machine instance itself.

Co-tenant traffic 320 factors into the trust score one or more elements related to the traffic such as how much traffic that co-tenant receives, the particular internet protocol (IP) addresses that are used, port numbers, etc. A virtual machine instance with a high level of traffic may be considered more trustworthy than a virtual machine instance with a low traffic level. A numerical value may be assigned based on threshold ranges of traffic size.

Cotenant entity size 316 factors into the trust score an element related to the size of the entity that owns the virtual machine instance. A large Fortune 500 corporation may be deemed more trustworthy than a small company, and thus a numerical value may be assigned based on size such as based on threshold ranges of size (e.g., number of employees, volume of annual revenue, etc.).

A numerical value may be assigned based on the geographical location 324 of the location of the entity (e.g., corporate office) that owns the virtual machine instance. Certain areas of the world may be less trustworthy than other areas in terms of corporate espionage, hacking, etc. and the numerical value for the geographical location 324 may reflect that issue.

Security problems pertaining to a virtual machine instance may factor into the trust score as well. Any publically known security issues 326 may be identified by based on on-line or other reports, and the entity itself may self-report to the service provider security issues 328 its virtual machine instance has experienced. Numerical values may be assigned based on the severity of the identified security problems, the frequency of the security problems, etc.

These and other or different factors may result in the computation of a trust score for each virtual machine. At least one and, in some embodiments, at least two of the factors are used to compute the trust score. If the trust scores are computed on a range of, for example, 0 to 100, a customer may specify in its cotenant policy that cotenancy requires a trust score for a potential cotenant of at least 80. That is, all cotenants on a server, in which one of the cotenant polices requires a trust score of 80, must have a computed trust score of 80 or higher. A new virtual machine instance to be placed on a server cannot be placed on that particular server if the trust score for the new virtual machine instance is less than 80.

Figure 14:
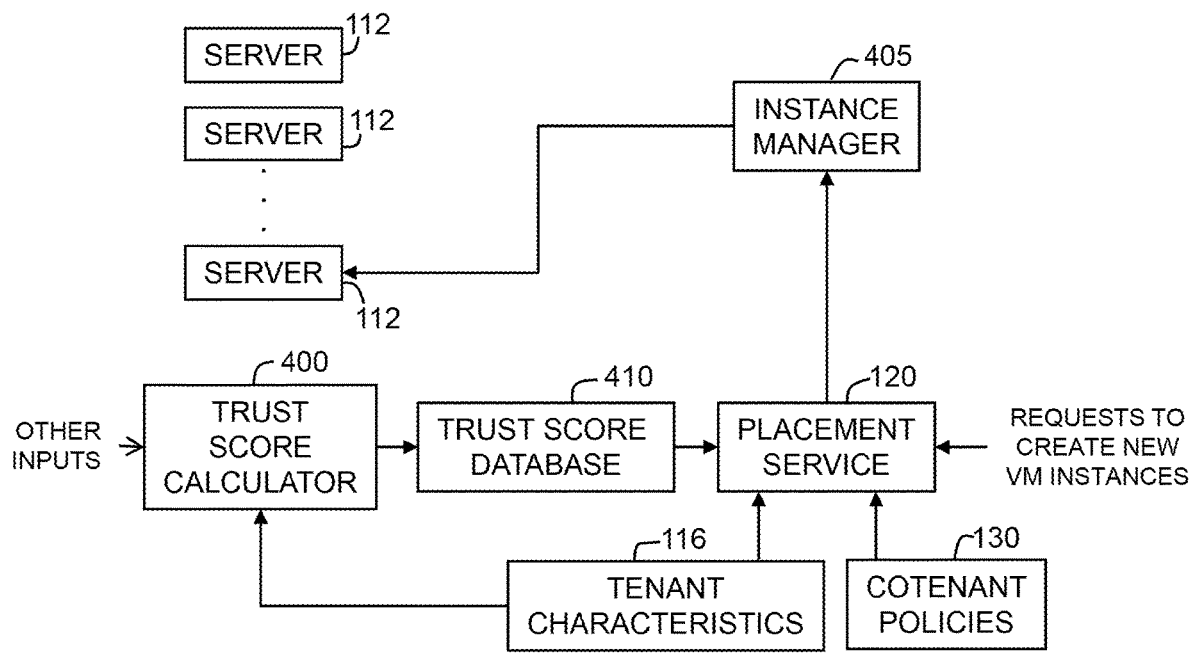
FIG. 14 shows a system diagram that includes a trust score calculator and a placement service in accordance with various examples.

FIG. 14 shows an example of a system which includes a trust score calculator 400 for calculating the trust scores explained above. The system includes physical servers 112, the placement service 120, tenant characteristics 116, cotenant policies 130, an instance manager 405, the trust score calculator 400, and a trust score database 410. As previously described, the placement service 120 receives a request to create a new virtual machine instance and accesses tenant characteristics 116 and cotenant policies 130 for any existing tenants already being hosted on a physical server 112 which is an acceptable candidate for hosting the new virtual machine instance. The placement service 120 evaluates the applicable cotenant policies (e.g., of the new virtual machine instance and/or the existing tenants) and sends a message to a instance manager 405 to cause the new virtual machine instance to be launched on the designated server 112.

The trust score calculator 400, which may comprise a processor, memory and other hardware resources executing a trust score calculator software program, access the tenant characteristics of the tenants hosted on the servers 112 and computes a trust score for each tenant on the servers. The trust score for each tenant may be computed during the process of deciding on which server 112 to originally place the new tenant, or at a later point in time. Characteristics of a tenant may be changed from time to time and thus the trust score for the tenant can be updated periodically by the trust score calculator 400.

The trust score for each tenant is stored by the trust score calculator 400 in the trust score database 410. When the placement service 120 operates to decide on which server 112 to place a new virtual machine instance, to the extent any applicable cotenant policy specifies a trust score, the placement service 120 accesses the trust score database 410 to retrieve the corresponding trust score. In other embodiments, the placement service 120 may send a request to the trust score calculator 400 to provide a trust score for a particular tenant and the trust score calculator 400 accesses the trust score database 410 to retrieve the requested trust score and return it to the placement service 120. The placement service 120 then uses the trust scores as explained above when deciding on which server to place a new tenant and/or whether all applicable cotenant polices remain in compliance. For example, a cotenant may experience a drop in its trust score due to a change in the characteristics of that cotenant. The newly computed trust score for that tenant may drop below a threshold trust score of another tenant's cotenant policy resulting in a violation of that cotenant policy, and possible migration of the offending cotenant.

Figure 15:
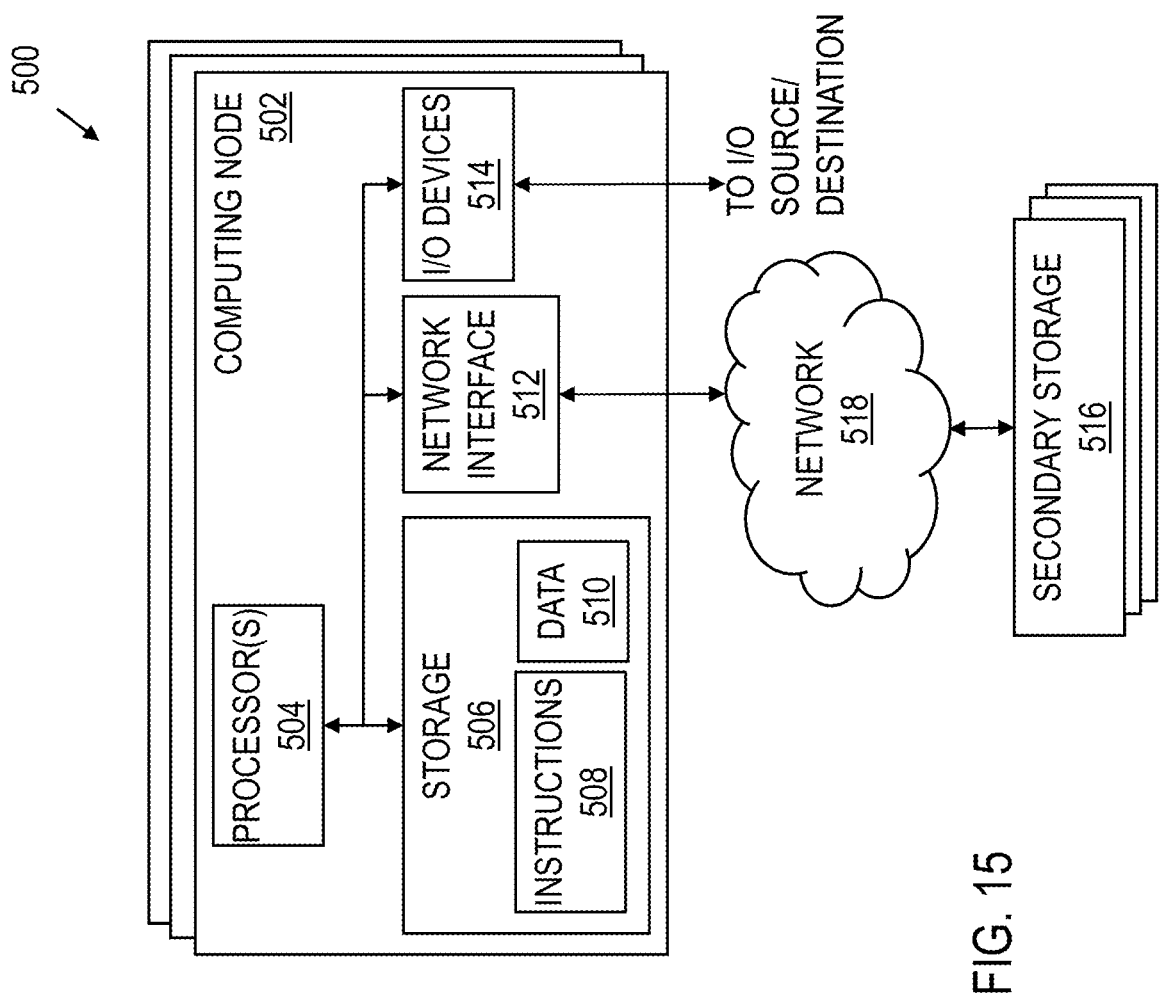
FIG. 15 is a block diagram of a computing nodes in accordance with various implementations.

FIG. 15 shows a schematic diagram for a computing system 500 suitable for implementation of the web services platform 102, including the functionality to create and use cotenant policies and trust scores as described herein in accordance with various embodiments. The system includes one or more computing nodes 502. The computing system 500 includes the computing nodes 502 and secondary storage 516 communicatively coupled together via a network 518. One or more of the computing nodes 502 and associated secondary storage 516 may be used to provide the functionality of the placement service 120, instance management interface 140, the workflow manager 150, the tenant policy management interface 160, the tenant policy manger 165, the migration service 220, the trust score calculator 400, and the instance manager 405.

Each computing node 502 includes one or more processors 504 coupled to memory 506, network interface 512, and I/O devices 514. In some embodiments, a computing node 502 may implement the functionality of more than one component of the system 100. In various embodiments, a computing node 502 may be a uniprocessor system including one processor 504, or a multiprocessor system including several processors 504 (e.g., two, four, eight, or another suitable number). Processors 504 may be any suitable processor capable of executing instructions. For example, it various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the web services platform 102, each of the computing nodes 502 may implement the same ISA, or individual computing nodes and/or replica groups of nodes may implement different ISAs.

The storage 506 may include a non-transitory, computer-readable storage device configured to store program instructions 508 and/or data 510 accessible by processor(s) 504. The storage 506 may be implemented using any suitable volatile memory (e.g., random access memory), non-volatile storage (magnetic storage such as a hard disk drive, optical storage, solid storage, etc.), Program instructions 508 and data 510 implementing the functionality disclosed herein are stored within storage 506. For example, instructions 508 may include instructions that when executed by processor(s) 504 implement placement service 120, instance management interface 140, the workflow manager 150, tenant policy management interface 160, tenant policy manger 165, migration service 220, trust score calculator 400, and instance manager 405, and/or other components of the service provider's network disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing nodes 502 via the network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing node 502 for execution by a processor 504 by transmission media or signals via the network 518, which may be a wired or wireless network or a combination thereof. Each of the placement service 120, instance management interface 140, workflow manager 150, tenant policy management interface 160, tenant policy manger 165, the migration service 220, trust score calculator 400, and instance manager 405 may be implemented as a separate computing node 502 executing software to provide the computing node with the functionality described herein. In some embodiments, two or more of the placement service 120, instance management interface 140, workflow manager 150, tenant policy management interface 160, tenant policy manger 165, migration service 220, trust score calculator 400, and instance manager 405 may be implemented by the same computing node.

The network interface 512 may be configured to allow data to be exchanged between computing nodes 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANS, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing nodes 502. Multiple input/output devices 514 may be present in a computing node 502 or may be distributed on various computing nodes 502 of the system 500. In some embodiments, similar input/output devices may be separate from computing node 502 and may interact with one or more computing nodes 502 of the system 500 through a wired or wireless connection, such as over network interface 512.

Those skilled in the art will appreciate that computing system 500 is merely illustrative and is not intended to limit the scope of embodiments. In particular, the computing system 500 may include any combination of hardware or software that can perform the functions disclosed herein, including computers, network devices, internet appliances, PDAs, wireless phones, pagers, etc. Computing node 502 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art ill appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

What is claimed is:

1. A non-transitory computer-readable storage device storing instructions that, when executed on a computing system, cause the computing system to:
   receive a request for creating a new virtual machine instance, the request mapped to a cotenant policy and characteristics of the new virtual machine instance;
   for each of a plurality of existing virtual machine instances executing on a server with each existing virtual machine instance having a separate cotenant policy, sequentially determine that characteristics of the new virtual machine instance match each of the cotenant policies of each of the plurality of existing virtual machine instances, the cotenant policy of each existing virtual machine instance created by the respective entity and including a requirement that must be met for another virtual machine instance to be hosted on the same server as the existing virtual machine instance;
   sequentially determine that characteristics of each of the existing virtual machine instances match the cotenant policy of the new virtual machine instance, the cotenant policy of the new virtual machine instance created by an entity that created the new virtual machine instance and including a requirement that must be met for another virtual machine instance to be hosted on the same server as the new virtual machine instance; and
   launch the new virtual machine instance on the server.

2. The non-transitory computer-readable storage device of claim 1 wherein at least one cotenant policy includes a trust score which other candidate virtual machine instances must meet in order to be created on the server.

3. The non-transitory computer-readable storage device of claim 1 wherein the instructions, when executed, cause the computing system to:
while the server hosts the plurality of existing virtual machine instances and the new virtual machine instance, compare the cotenant policies of each of the new and plurality of existing virtual machine instances to the virtual machine characteristics of each of the other new and plurality of existing virtual machine instances;
reassess whether continued hosting of any of the new and plurality of existing virtual machine instances violates any of the cotenant policies; and
after determining a cotenant policy violation, migrate the virtual machine instance in violation of a cotenant policy to another server.

4. The non-transitory computer-readable storage device of claim 1 wherein the instructions, when executed, cause the computing system to:
select the server on which to launch the new virtual machine instance based on no violation of the cotenant policy mapped to the request and based on a virtual machine image type included in the request.

5. The non-transitory computer-readable storage device of claim 1 wherein each cotenant policy includes a restriction for at least one of:
a virtual machine image type;
an operating system type;
an application type;
a security type; and
a geographical location.

6. The non-transitory computer-readable storage device of claim 1 wherein the instructions, when executed, cause the computing system to:
receive a change to an existing cotenant policy of one of the new and existing virtual machine instances;
determine whether the changed cotenant policy is in violation; and
responsive to a determination of the cotenant policy violation, migrate the virtual machine instance whose cotenant policy is in violation from the server to a different server.

7. A method for monitoring a network, comprising:
receiving a request for creation of new virtual machine instance;
determining a candidate set of physical servers on which to launch the new virtual machine instance;
for each of a plurality of existing virtual machine instances already hosted on a physical server with each of the plurality of existing virtual machine instances having a separate cotenant policy stored on the physical server, separately comparing each of the separate cotenant policies to characteristics of the new virtual machine instance, the cotenant policy of each of the existing virtual machine instances created by an entity that created the respective existing virtual machine instance; and
upon determining that launching the new virtual machine instance complies with the existing virtual machine instances' cotenant policies, launching the new virtual machine instance on the same physical server that hosts the existing virtual machine instances.

8. The method of claim 7 further comprising comparing a cotenant policy of the new virtual machine instance to characteristics of the existing virtual machine instance.

9. The method of claim 8 further wherein launching the new virtual machine instance comprises launching the new virtual machine instance on the same physical server that hosts the existing virtual machine instances upon determining that launching the new virtual machine instance complies both with the cotenant policy of the new virtual machine instance and the cotenant policies of the existing virtual machine instances.

10. The method of claim 7 further comprising:
computing a trust score for the new virtual machine instance before it is launched on the same physical server that hosts the existing virtual machine instances;
wherein each of the cotenant policies includes a trust score threshold, and
wherein determining that launching the new virtual machine instance complies with the existing virtual machines' cotenant policies includes determining whether the trust score for the new virtual machine instance exceeds the trust score threshold in the cotenant policies.

11. The method of claim 10 wherein computing the trust score includes computing a trust score based on at least two of: virtual machine image type, an operating system type, an application type, a virtual machine instance entity size, a geographical location, security issues experienced by a virtual machine instance, and a security level.

12. The method of claim 7 further comprising:
after launching the new virtual machine instance on the same server, comparing the existing virtual machine instances' cotenant policies to characteristics of the launched new virtual machine instance;
determining that the characteristics of the launched new virtual machine instance do not comply with at least one of the existing virtual machine instances' cotenant policies; and
migrating the launched new virtual machine instance to a different physical server.

13. The method of claim 7 wherein comparing the cotenant policies to the characteristics includes comparing a requirement for cotenancy to a characteristic of the new virtual machine instance that defines a resource of the virtual machine instance, the resource including at least one of a virtual machine image type, an operating system type, a security level, and a traffic rate.

14. The method of claim 7 further comprising receiving a request to change a cotenant policy for a virtual machine instance already hosted on the physical server, determining whether the changed cotenant policy is in violation, and migrating a virtual machine instance from the server.

* * * * *